No. 837,677. PATENTED DEC. 4, 1906.
B. F. ENNIS.
INDICATOR FOR TRUING UP WORK.
APPLICATION FILED NOV. 20, 1905.
3 SHEETS—SHEET 1.
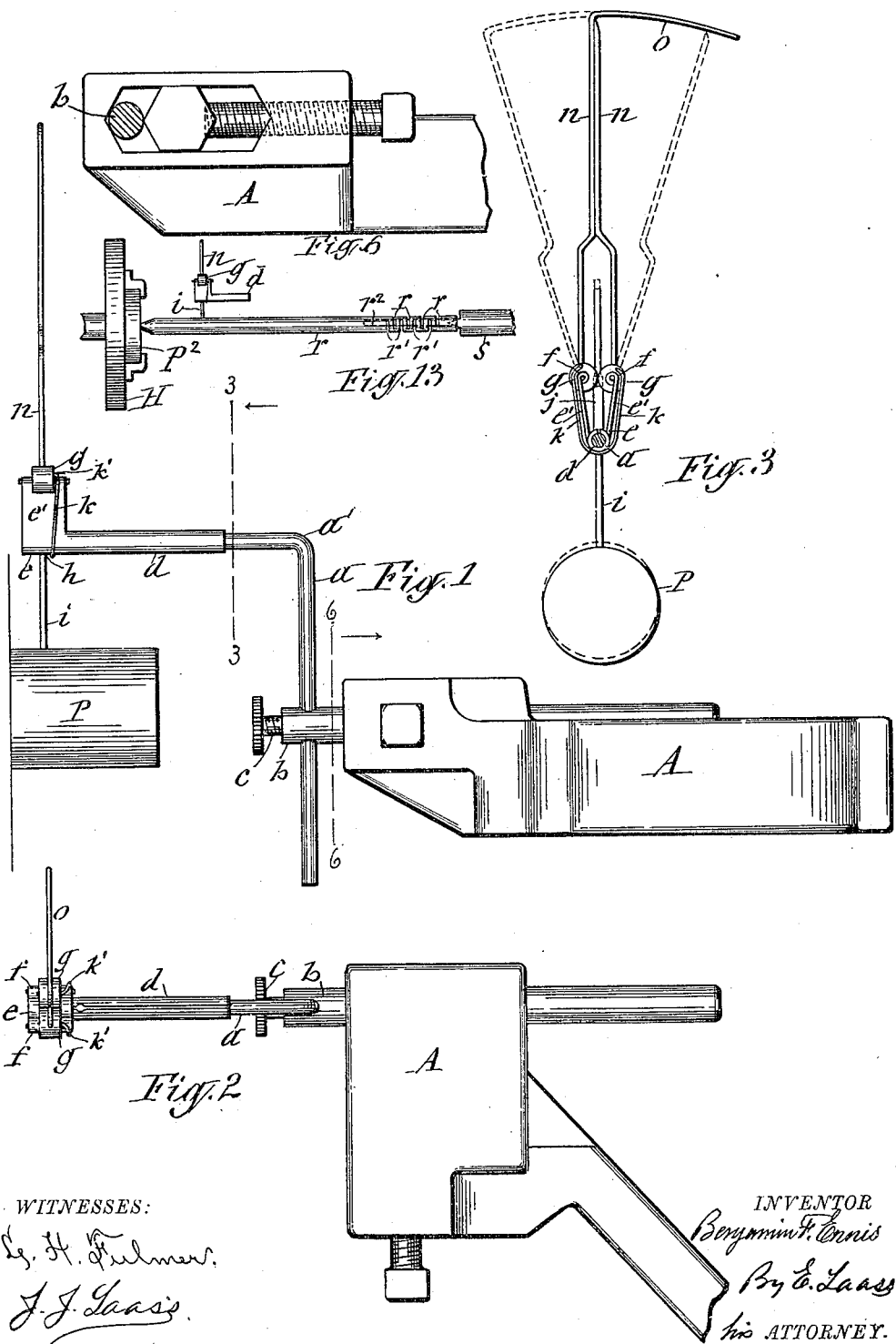

No. 837,677. PATENTED DEC. 4, 1906.
B. F. ENNIS.
INDICATOR FOR TRUING UP WORK.
APPLICATION FILED NOV. 20, 1905.
3 SHEETS—SHEET 2.
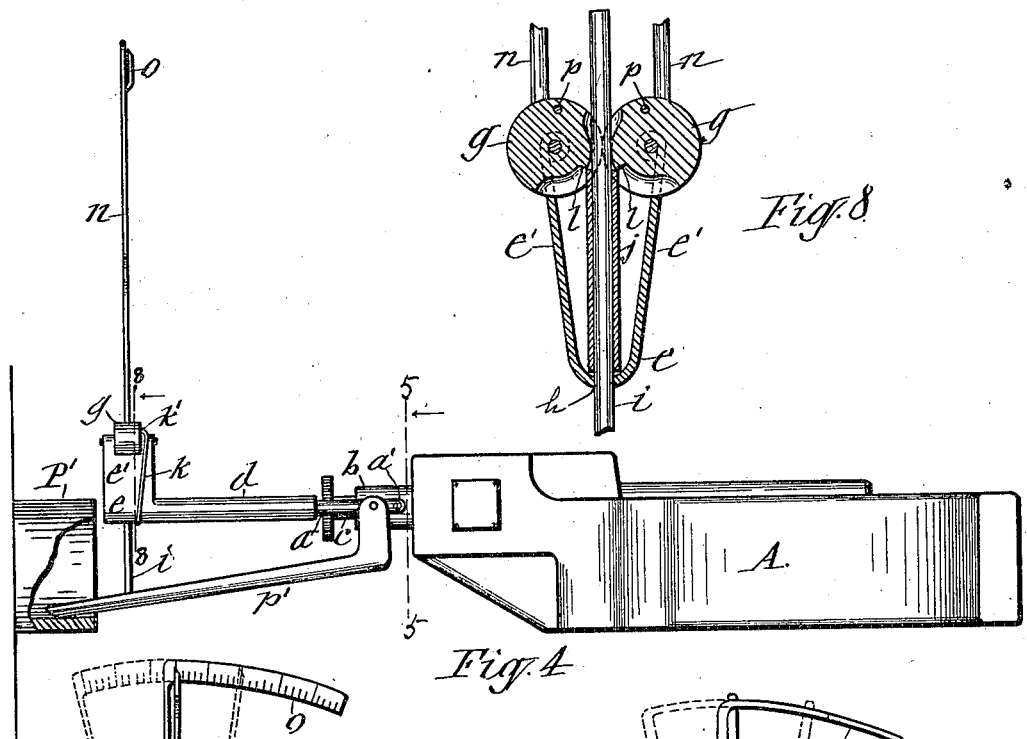
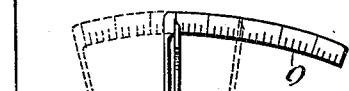
WITNESSES:
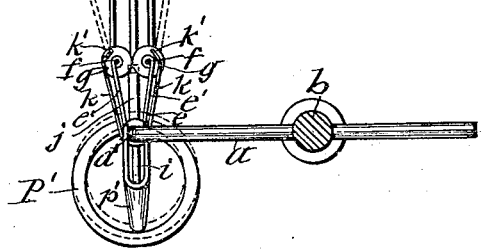
INVENTOR
Benjamin F. Ennis
By E. Laass
his ATTORNEY.

No. 837,677. PATENTED DEC. 4, 1906.
B. F. ENNIS.
INDICATOR FOR TRUING UP WORK.
APPLICATION FILED NOV. 20, 1905.
3 SHEETS—SHEET 3.
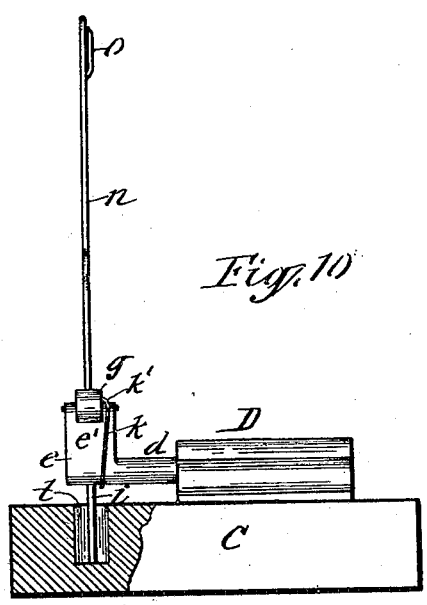
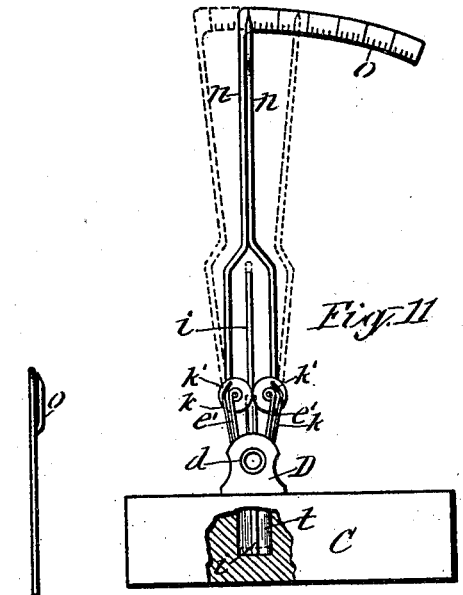
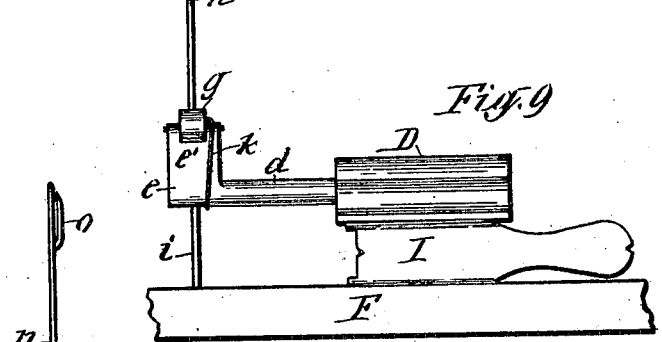
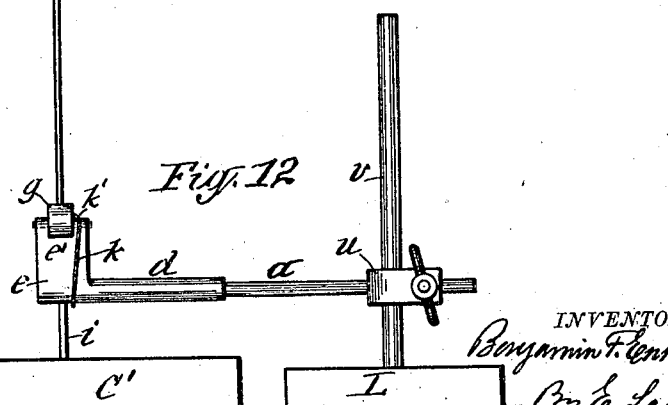
WITNESSES:
INVENTOR
Benjamin F. Ennis
By E. Laass
his ATTORNEY.

UNITED STATES PATENT OFFICE.

BENJAMIN F. ENNIS, OF SYRACUSE, NEW YORK, ASSIGNOR OF ONE-HALF TO JOHN N. SCISM, OF SYRACUSE, NEW YORK.

INDICATOR FOR TRUING UP WORK.

No. 837,677.  Specification of Letters Patent.  Patented Dec. 4, 1906.

Application filed November 20, 1905. Serial No. 288,108.

*To all whom it may concern:*

Be it known that I, BENJAMIN F. ENNIS, of Syracuse, in the county of Onondaga, in the State of New York, have invented new and useful Improvements in Indicators for Truing Up Work, of which the following, taken in connection with the accompanying drawings, is a full, clear, and exact description.

This invention relates to the class of indicators which are designed for determining any degree of inaccuracy of work on a lathe or other machine on which it is mounted to be operated on.

The object of the invention is to provide an indicator which shall be adapted to be used in various positions and applicable to lathes, planers, milling-machines, drill-presses, and analogous machines and shall be very sensitive and efficient in detecting and indicating any defect in either the shape or position of the work in relation to the machine on which it is mounted; and to that end the invention consists in the novel construction of the indicator hereinafter described and claimed.

In the accompanying drawings, Figures 1 and 2 are side and plan views, respectively, of an indicator embodying my invention as used for ascertaining if a piece of work is perfectly round on its exterior or perfectly centered in a lathe. Fig. 3 is a transverse section on the line 3 3 in Fig. 1, showing in dotted lines the action of the indicator when applied to a cylindrical piece of work which is not perfectly centered in the lathe or defective in its circular exterior. Fig. 4 is a side view of the indicator as used for axially centering on a lathe a hollow cylindrical body or an annular socket or cavity in an article mounted on the lathe. Fig. 5 is a transverse section on the line 5 5 in Fig. 4 viewed in the direction of the arrow. Fig. 6 shows the means for holding the indicator in operative position on a lathe viewed from the line 6 6 in Fig. 1. Fig. 7 is a face view of a modification of the construction of the indicator. Fig. 8 is an enlarged sectional view on the line 8 8 in Fig. 4. Fig. 9 shows the indicator adapted to be set at any required height on the table of a planer or other machine to determine the height of the surface of the work operated on. Fig. 10 shows the indicator held in a surface-block testing the depth of a socket or cavity drilled in a piece of work.

Fig. 11 is a face view of said indicator, showing by dotted lines its action in case the
aforesaid socket or cavity is not of the required depth. Fig. 12 shows the indicator used in connection with a surface-gage for accurately setting the work on a machine bed or table, and Fig. 13 is a side view of a further modification of the means for transmitting motion to the indicator.

Similar letters of reference indicate corresponding parts.

*a* denotes the supporting-arm of the indicator, which arm is preferably of the form of a steel bar which is bent at a right angle, as shown at *a'* in Fig. 1, to allow the indicator to be supported in proper operative position on a lathe, in which case a suitable tool-holder A is secured to a tool-post mounted on the lathe in the usual manner. (Not shown in the accompanying drawings.) In the said tool-holder is clamped a stud *b*, which is provided with a transverse aperture, into which is inserted one of the end portions of the supporting arm or bar *a*. In the outer end of the stud *b* is a screw-threaded axial channel containing a thumb-screw *c*, by means of which the arm *a* is adjustably clamped in the stud *b*. The opposite end of the arm *a* is inserted in a sleeve *d*, which is movable longtiudinally and at the same time embraces said arm sufficiently tight to support the arm in its desired position. The free end of the sleeve *d* is formed with a head *e*, consisting of two flexible plates *e' e'*, extending slightly divergent from the sleeve *d* and terminating in bearings *f f*, in which are pivoted two rollers *g g*.

The base of the head *e* is provided with an orifice *h*, receiving through it a stem *i*, which passes between the rollers *g g*, as shown more clearly in Fig. 8 of the drawings. The portion of the stem *i* which is within the head *e* is tightly embraced by a sleeve *j*, the upper end of which engages shoulders *l* on the peripheries of the rollers *g g*, which are forced toward the stem *i* by means of a suitable spring *k*, pressing the plates *e' e'* toward each other. Said spring is preferably formed from a wire bent V-shaped and passing across the bottom of the head *e* and terminated in inward bends *k'*, which are inserted into sockets *p* in the rollers *g g*.

To each of the rollers is fastened a pointer *n*, which has its free end normally contiguous to the side of the companion pointer, as shown in full lines in Figs. 3, 5, 7, and 11 of the drawings. One of said pointers is preferably provided with a segmental graduated scale or gage $o$, which extends laterally from the free end of said pointer and in position to be traversed by the free end of the other pointer.

The operation of the described indicator when used on a lathe and supported by means of a suitable tool-holder A is as follows: Assuming that the piece of work mounted on the head or chuck of the lathe is of cylindrical form or has a circular or cylindrical projection in regard to which the work is to be centered on the lathe, as shown in Figs. 1 and 3 of the drawings, the indicator is to placed in position to allow the free end of the stem $i$ to bear on the periphery of the cylindrical or circular part P of the work. The attendant of the lathe pushes the stem $i$ into contact with the part P while holding the pointers contiguously side by side when the stem $i$ is in its normal position—i. e., in its bearing on the lowest portion of the surface of the work P, traversed by the stem $i$. The attendant of the lathe then releases his hold on the pointers $n$ $n$ and turns the work P chucked to the lathe. In case the said work is not properly centered in the lathe the stem $i$ receives an upward thrust by its contact with the eccentrically-placed work. The sleeve $j$, having a frictional hold on the stem, is caused to move with it and by its engagement with the shoulders $l$ $l$ on the rollers $g$ $g$ said rollers are turned and caused to swing the pointers $n$ $n$ from each other, and thus indicate the degree of eccentricity of the work P, as shown in dotted lines in Fig. 3 of the drawings.

The described indicator operates in the same manner in centering or truing the interior of a cylindrical or circular hollow part P' of work mounted in the lathe, as represented in Figs. 4 and 5 of the drawings, in which case I pivot to the arm or bar $a$ an elongated finger $p'$, the free end of which is placed upon the inner surface of the work P' and the stem $i$ set upon the said finger in proximity to the work P' and is thus caused to vibrate in case said work is not in center in the lathe.

The described indicator may also be used in connection with a flexible rod $r$, placed at one end central on the dead spindle $s$ of the lathe and at its opposite end in the center of the work $P^2$, clutched on the head H of the lathe, as shown in Fig. 13 of the drawings. In this application of the indicator it is placed in position to allow the stem $i$ to be set on the rod $r$, which receives a vibratory motion in case the work $P^2$ is not perfectly centered on the lathe. The vibration of said rod actuates the stem $i$, and thereby causes the pointers of the indicator to move and show the degree of eccentricity of the work $P^2$. The rod $r$ is rendered flexible by notches $r'$, cut alternately in opposite sides of the rod. A spring-wire $r^2$ is inserted in a central longitudinal bore in the notched portion of the rod to maintain said rod normally straight.

The described indicator is also very useful and very convenient and reliable in determining the depth of a socket or recess $t$ in a plate C, as illustrated in Figs. 10 and 11 of the drawings. For this purpose the indicator is to be attached to a block D, which securely retains the indicator in its erect position. The indicator is to be first adjusted by placing on the bed F of the drill-press or other uniform surface a gage I, of precisely the same depth as the socket $t$ to be drilled, and placing on the top of said gage the block D, with the indicator attached thereto. Then the operator pushes down the stem $i$ to cause it to bear on the bed F, as shown in Fig. 9 of the drawings, the pointers $n$ $n$ being in the meantime held by the operator to prevent their movement from normal position—i. e., contiguously side by side. Then the block D, with the indicator, is removed from the gage I and ready to be placed on the work or plate C and in position to allow the stem $i$ to be inserted into the socket $t$, drilled in said plate, as shown in Figs. 10 and 11 of the drawings. In case the said socket has not been drilled to the required depth the contact of the stem $i$ with the bottom of said socket pushes up the said stem and causes the pointers $n$ $n$ to swing from each other, as represented by dotted lines in Fig. 11 of the drawings, and thus indicate the deficiency in the depth of the socket $t$.

A still further use of my improved indicator is illustrated in Fig. 12 of the drawings, in which it serves to enable the attendant of the machine to accurately set a block or work C' on the bed or table of the machine which is to operate on said block. In this case the indicator is disposed over the top of the block C' and supported by the bar or arm $a$, which is suitably connected to a collar $u$, embracing a vertical cylindrical post $v$, which rises from a base L, mounted on the bed F. The arm $a$ is movable longitudinally on the collar $u$, which is adapted to turn on the post $v$ and thus allows the indicator to be placed over different parts of the plate C'. The stem $i$ being held in contact with the surface of the plate C' during the shifting of the indicator in its position on the said plate causes the stem $i$ to be forced upward by any raised portion of the surface of the plate traversed by the stem. Said movement of the stem causes the pointers $n$ $n$ to be vibrated and indicate very distinctly said unevenness of the traversed surface.

In the modification shown in Fig. 7 of the drawings the rollers $g$ $g$, hereinbefore described, are dispensed with, and instead thereof the indicating-pointers $n$ $n$ are pivoted to a vertically-movable pin $u$, which is interposed transversely between the pointers at a short distance from the lower ends thereof. The spring-arms $e'$ $e'$ of the head $e$ engage at their upper ends with notches $v$ $v$ in the sides of the pointers above the pivot-pin $u$ and press said pointers to each other, as shown in full lines in said figure. In the said action the pivot-pin $u$ is depressed to its normal position. The stem $i$ bears on the bottom of the pivot-pin, and in case said stem receives an upward thrust the pivot-pin is pushed up, and is thereby caused to swing the indicating-pointers $n$ $n$ from each other, as represented in dotted lines.

It will be observed that my described indicator possesses several meritorious advantages, among which the following are very important, viz: First, it is adapted to be used in various positions and for various purposes desired by machinists working on lathes, planers, milling-machines, drill-presses, and other machines; secondly, it is very convenient in its application for the said purposes; thirdly, it is very sensitive and reliable in its actions, owing to the length of the indicating-pointers, causing a greatly-augmented indicating movement thereof, and, fourthly, it is readily adjusted for various purposes.

What I claim as my invention is—

1. An indicator for truing up work and analogous purposes comprising a supporting-arm, a head carried on said arm, rollers pivoted to said head, indicating-pointers attached to the rollers, and a longitudinally-movable stem guided in said head to bear on the work and transmit motion to the rollers.

2. An indicator, for truing up work, and analogous purposes, comprising a supporting-arm, a head carried on said arm and formed with flexible side plates, indicating-pointers pivotally supported between said side plates, and a longitudinally-movable stem actuated by the work and transmitting motion to the indicating-pointers.

3. An indicator for truing up work and analogous purposes, comprising a supporting-arm, a head carried on said arm and formed with flexible side plates, rollers pivoted to said side plates, indicating-pointers attached to the rollers, and a longitudinally-movable stem actuated by the work and transmitting motion to the indicating-pointers.

4. An indicator for truing up work and analogous purposes, comprising a supporting-arm, a sleeve embracing said arm, and adjustable longitudinally thereon, a head projecting from said sleeve and formed with flexible side plates, rollers pivoted to said side plates, indicating-pointers attached to said rollers, a spring disposed to press the side plates toward each other, and a longitudinally-movable stem transmitting motion from the work to the rollers.

5. An indicator, for truing up work and analogous purposes, comprising a supporting-arm, a head carried on said arm and formed with flexible side plates, rollers pivoted to said side plates and provided on their adjacent sides with shoulders, indicating-pointers attached to the rollers, a longitudinally-movable stem passing between the rollers and adapted to bear on the work, and a sleeve embracing the stem and engaging the shoulders of the rollers as set forth.

6. An indicator, for truing up work and analogous purposes, comprising a support, a head projecting from said support, indicating-pointers pivotally supported on said head, a longitudinally-movable stem transmitting motion to the indicating-pointers, and a laterally-yielding bar engaging the work and actuating the aforesaid stem.

7. An indicator for truing up cylindrical work, comprising a supporting-arm, a head projecting from said arm, indicating-pointers pivotally supported on said head, a finger pivoted at one end to the supporting-arm and adapted to bear with its opposite end on the interior of the cylindrical work, and a stem bearing on said finger and transmitting motion to the indicating-pointers.

8. A bar supported at one end in the center of the lathe and bearing with the opposite end on the work, and provided with transverse notches in opposite sides to impart flexibility to said bar, in combination with a longitudinally-movable stem actuated by said bar, and indicating-pointers actuated by the stem.

9. A bar supported at one end in the center of the lathe and bearing with the opposite end on the work and having transverse notches in opposite sides to impart flexibility to said bar, and means for sustaining said bar in its normal position in combination with a longitudinally-movable stem riding endwise on said bar, and indicating-pointers actuated by said stem.

BENJAMIN F. ENNIS.

Witnesses:
J. J. LAASS,
L. H. FULMER.